Inventor
James M. Weaver
By Owen & Owen
Attorneys

Patented June 29, 1937

2,085,242

UNITED STATES PATENT OFFICE 2,085,242

ARC WELDING CIRCUIT

James M. Weaver, Monroe, Mich.

Application July 2, 1936, Serial No. 88,648

3 Claims. (Cl. 219—8)

This invention relates to electric arc welding circuits and more particularly to circuits for use with low frequency alternating current.

In using sixty cycle alternating current arc welding apparatus, difficulty has been experienced in maintaining the arc steadily enough so that long, uniform welds might be made. In some types of apparatus it has also been found that the welding rod heated up to such an extent that operations must be stopped to allow the parts to cool and, frequently a coated rod must be discarded while it is still several inches long because all of the coating has been destroyed by the intense heat.

Another disadvantage has been in the inability of these welders to do overhead work. Since the direction of current flow reverses and is almost exactly equal in each direction, the metal is not drawn to the weld as is the case in direct current machines. The result is that hot metal from the welding rod falls back on the operator or flows down the rod to the rod holder, either condition resulting in a poor weld and considerable danger to the user of the apparatus.

The primary object of the present invention is the provision of a low frequency alternating current welding apparatus, having no moving parts, which gives a constant arc capable of use with bare or coated welding rods in any position without extinguishing the arc or overheating the body of the rod.

Other objects and advantages of the invention will become apparent as the description proceeds, reference being had to the accompanying drawing in which—

Figure 1:
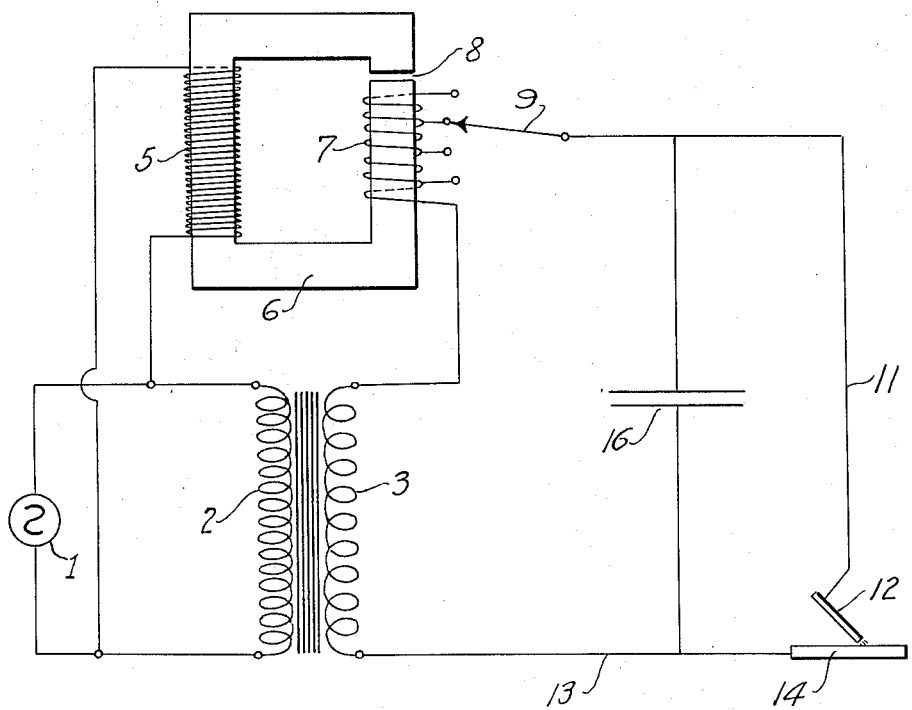
Figure 2:
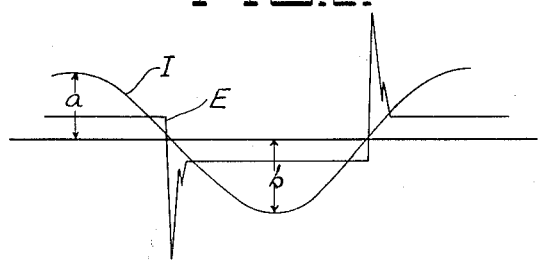

Figure 1 is a circuit diagram of a welder constructed in accordance with the present invention; and Figure 2 is a typical oscillogram of arc current and arc voltage taken during operation.

Referring to the drawing, the circuit includes a source of alternating current 1 directly connected to the primary 2 of a step down welding transformer. The secondary 3 of the welding transformer is provided with a suitable number of turns such that the voltage across the secondary is approximately 43% of the primary voltage.

A reactance 5 is connected in parallel with the primary of the welding transformer and includes a large number of turns wound on one leg of a box type core 6. A tapped reactance 7 is wound on the opposite leg of the core 6 and is connected in series with the secondary 3 of the welding transformer. In order to increase the reluctance of the core 6, an air gap 8 is provided in one of the legs and is preferably held quite small, in the order of .1 inch. A movable arm or contact 9 is provided to cooperate with the taps of the coil 7 so as to cut turns in or out of this coil and thus provide a plurality of welding heats. Obviously, the number of turns and the number of taps to be included in the coil 7 may be varied over a wide range depending on the type of work to be done with the welder. The welding leads include a connection 11 from the arm 9 to the rod, diagrammatically shown at 12, and a connection 13 from one side of the transformer secondary 3 to the work, diagrammatically shown at 14.

A condenser 16 is connected across the welding leads 11 and 13 and may be made of a variable capacity. The purpose of the condenser is to intensify and stabilize the arc by discharging whenever the arc current wave passes zero, or when the arc tends to become extinguished.

While there is no set proportion for the various parts of the device according to any rule with which I am familiar, it has been found that a welder for use on a 220 volt 60 cycle supply in which a welding current of slightly over 100 amperes is desired, that the large coil 5 should include approximately 650 turns if wound on an iron core having a cross sectional area of about 9 square inches. The reactance 7 is, of course, variable due to the fact that it is tapped so that there is no definite number of turns to be used. It has been found that the condenser 16 operates most satisfactorily at about 7 mf.

An oscillogram taken during a welding operation is shown in Fig. 2. The arc current wave is designated I and the arc voltage wave is designated E. It will be seen that the voltage across the arc is constant except when passing from one sign to another. When the arc voltage reverses, the reversal is in the form of a "kick" so that the voltage across the welding electrodes 12 and 14 rises to a very considerable value, several times that of the constant portion of the wave. This rapid and extremely large alternation prevents extinction of the arc. That the arc is not extinguished is shown by the fact that the arc current wave I is a perfect sine wave. If the arc were extinguished during any considerable portion of the operation, the current would drop to zero and remain along the zero line until the arc were reestablished by reason of a high voltage between the welding electrodes.

It has been found in connection with a welder built in accordance with the present invention that the arc current wave contains a direct current component. The ordinate $a$ indicated in Figure 2 is found to be considerably smaller than the ordinate b so that, while the alternations are regular, they are displaced vertically in Figure 2, indicating that more current is flowing in one direction than in the other. This direct current component may be due to the arc characteristics, since current will flow more readily from one side of an arc than the other in case the electrodes are of different size and material, however two carbon rods, when used for the arc show that one of the rods forms a tip and the other rod forms a crater. The direct current present amounts to approximately 10 amperes when the entire welding current is slightly over 100 amperes. The direct current component was read on a regular direct current ammeter, the needle of which swung from 5 to 15 amperes.

It will be readily appreciated that a direct current component in the arc current permits overhead work to be accomplished without difficulty. Actual operation proves this to be the case.

While the invention has been described in connection with elements having specific physical and electrical characteristics, it should be expressly understood that various changes may be made in the form, size and disposition of the parts without departing from the invention as defined in the appended claims.

What I claim is:

1. In an alternating current arc welding apparatus, a main transformer, a second transformer separate from said main transformer and being so constructed as to have a high reluctance and having its primary winding in parallel with the primary of said main transformer and its secondary in series with the secondary of said main transformer, welding electrodes connected in series with said secondaries, and a condenser in parallel with said welding electrodes.

2. In an alternating current arc welding apparatus, a main transformer having primary and secondary windings, a second transformer having a high reluctance core and primary and secondary windings thereon, said primary winding being in parallel with the primary winding of said main transformer and said secondary winding being in series with the secondary winding of said main transformer, means to vary the effective number of turns in said secondary winding, welding electrodes in series with both of said secondary windings, and a condenser in parallel with said welding electrodes.

3. A low frequency alternating current welding system comprising a source of alternating current, a transformer having its primary winding connected to the output terminals of the source of alternating current, a second transformer comprising a box-type core having an air gap therein and having a primary winding connected in parallel with the primary winding of the first-named transformer and having a tapped secondary winding connected in series with the secondary winding of the first-named transformer, a work circuit including a welding rod and a work element which are connected in series with the secondary windings of the two transformer systems, and a capacity connected in parallel with the said welding rod and work element.

JAMES M. WEAVER.